3,506,045
DUAL CHUCK ASSEMBLY FOR VENEER LATHES
Nathaniel Bosco, Portland, Oreg., assignor to Premier Gear & Machine Works, Portland, Oreg., a corporation of Oregon
Filed Nov. 20, 1967, Ser. No. 684,228
Int. Cl. B27c 7/04; B27l 5/02
U.S. Cl. 144—209
4 Claims

ABSTRACT OF THE DISCLOSURE

A veneer lathe frame supports at each end a pair of chucks mounted one on each of a pair of concentric spindles which are connected through thrust bearings one to each of a pair of concentric reciprocative hydraulic piston-cylinder drive units.

BACKGROUND OF THE INVENTION

This invention relates to veneer lathes, and more particularly to a simplified and compact dual chuck and drive assembly for veneer lathes.

Dual chuck and drive assemblies for veneer lathes have been provided heretofore for the primary advantage of enabling the reduction of a log to minimum core diameter, for maximum utilization of the log and minimum waste. However, such assemblies of the prior art are characterized disadvantageously by structures in which the drive system components are arranged in a longitudinal assembly with a substantial number of moving parts exposed to jamming and other damage if not kept relatively clean and free of debris. The length of such assemblies utilizes excessive plant space and requires heavy supporting structure. Moreover, such assemblies are relatively costly to manufacture and maintain.

SUMMARY OF THE INVENTION

In its basic concept the dual chuck and drive assembly of the present invention involves a concentric arrangement of spindles and reciprocative hydraulic piston-cylinder drive units associated therewith.

It is by virtue of the foregoing basic concept that the principal objective of the present invention is achieved, namely to provide for veneer lathes a dual chuck and drive assembly characterized by a minimum number of components arranged compactly in a concentric arrangement of minimum length with no moving parts exposed to the deleterious effects of dust and debris. The arrangement further minimizes the requirement of plant space and support structure, and minimizes the cost of manufacture and maintenance.

The foregoing and other objects and advantages of the present invention will appear from the following detailed description, taken in connection with the accompanying drawing of the preferred embodiment.

DESCRIPTION OF THE PREFERRED EMBODIMENT

Figure 1:
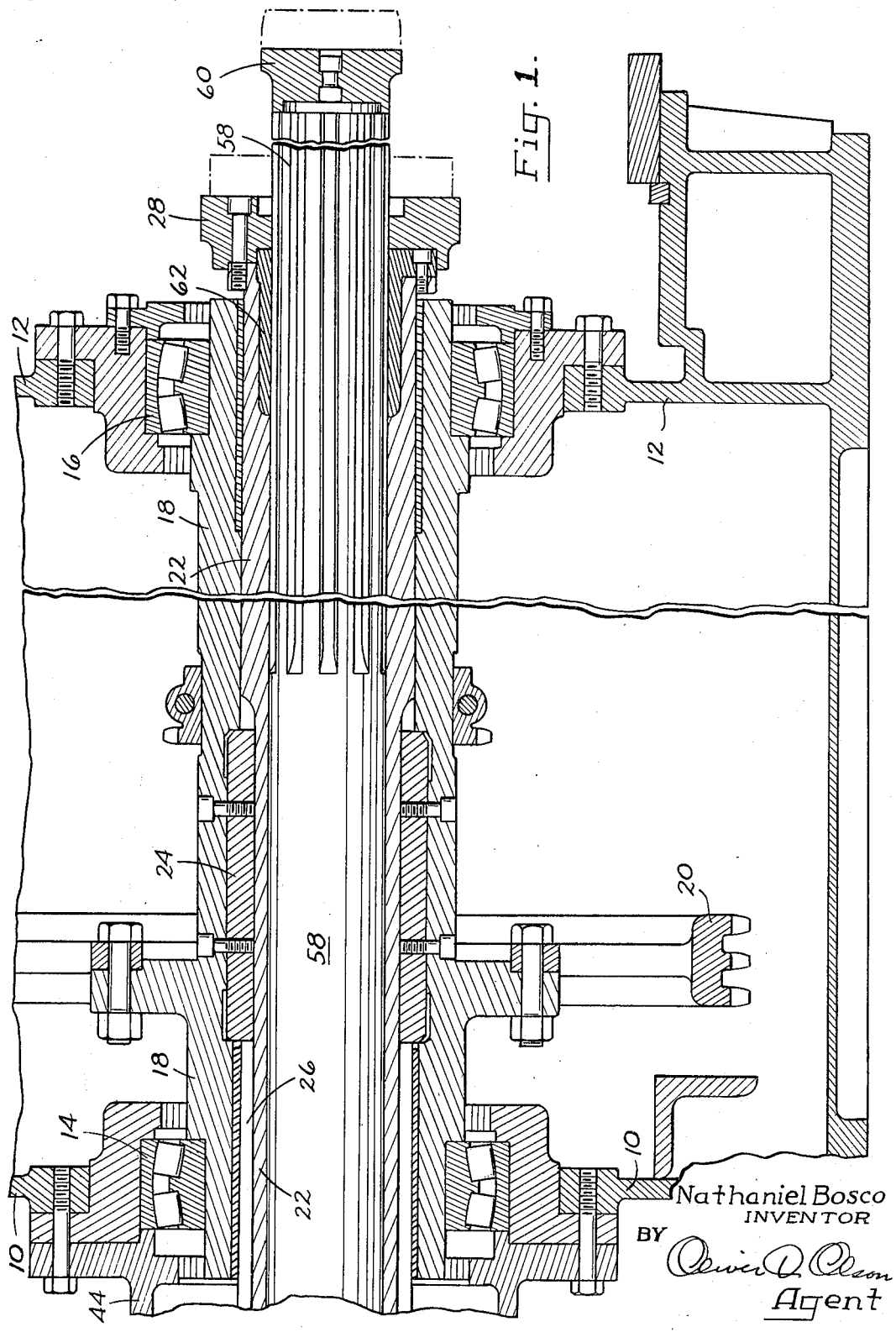
FIG. 1 is a foreshortened fragmentary view in longitudinal section of the chuck and spindle portion of a dual chuck and drive assembly embodying the features of the present invention.

In FIG. 1 there is shown laterally spaced members 10 and 12 of a veneer lathe frame. As is well known, the frame supports a pair of laterally spaced, axially aligned chuck assemblies which function to support between them a log to be peeled. Since the chuck assemblies of each pair are substantially identical, only one of them is illustrated in the drawing.

Secured to the laterally spaced frame members 10 and 12 are the annular bearings 14 and 16, respectively, which support between them the hollow elongated quill 18. A drive sprocket 20 is secured to the quill for rotating with the latter by coupling to a source of power (not shown) through such means as a drive chain.

Extending through the hollow quill is an elongated hollow outer spindle 22. A drive key 24, secured to the quill, slidably engages an elongated keyway 26 in the outer spindle. The latter thus is connected to the quill for axial rotation with the latter, while accommodating longitudinal movement of the outer spindle relative to the quill.

Figure 2:
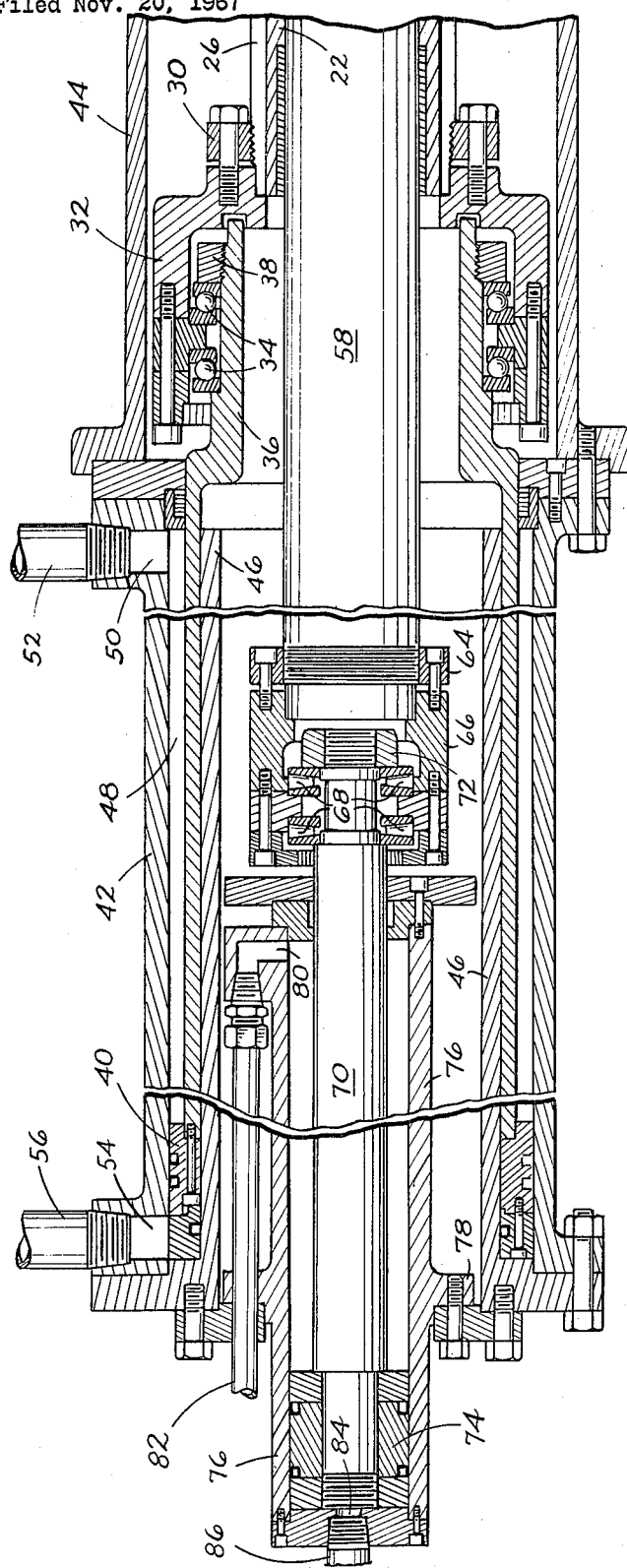
FIG. 2 is a foreshortened fragmentary view in longitudinal section, forming a continuation of FIG. 1, showing the concentric drive portion of the assembly.

The outer spindle projects forwardly beyond the quill and removably mounts a hollow outer chuck 28. The rearward end of the outer spindle is connected through the nut 30 (FIG. 2) to the outer spindle adapter 32. The adapter is hollow, and removably contains the hollow thrust bearing 34.

The forward end of an elongated hollow outer piston rod 36 is connected to the thrust bearing 34 by means of the nut 38. The piston rod and outer spindle thus are connected together for simultaneous longitudinal movement while affording axial rotation of the outer spindle relative to the piston rod.

The rearward end of the hollow piston rod 36 is attached to an annular piston 40 confined slidably in an elongated outer cylinder 42. The forward end of the cylinder is secured to the rearward end of an elongated hollow thrust tube 44, the forward end of which is secured to the frame member 10. The thrust tube functions additionally to enclose the thrust bearing 34 and the rearward portion of the outer spindle 22.

An elongated hollow outer piston guide tube 46 is secured at its rearward end to the outer cylinder 42 and extends forwardly into the latter in spaced, concentric relationship. The hollow outer piston 40 and piston rod 36 are disposed in the annular space 48 between the outer cylinder and guide tube.

The annular space 48, at the front end of the piston 40, communicates through the passageway 50, conduit 52 and a control valve (not shown) selectively with a source of hydraulic fluid pressure and exhaust. Similarly, the rearward end of the piston communicates through the passageway 54, conduit 56 and a control valve (not shown) selectively with a source of hydraulic fluid pressure and exhaust. Thus, the piston may be caused to reciprocate through the outer cylinder in forward and rearward directions by appropriate application of hydraulic fluid pressure, as will be apparent.

Extending through the hollow assembly of the outer chuck 28, outer spindle 22 and outer thrust bearing 34 is an elongated inner spindle 58. The forward end of the inner spindle extends beyond the outer chuck, and removably mounts the inner chuck 60. As is well known, this inner chuck is of smaller diameter than the outer chuck, whereby to accommodate reduction of a peeler log to a waste core of minimum diameter.

The forward portion of the inner spindle is splined, and is slidably engaged by the drive spline 62 secured removably to the outer spindle. The inner spindle thus is connected to the outer spindle for simultaneous axial rotation, while accommodating relative longitudinal movement of said inner and outer spindles.

The rearward end of the inner spindle is connected through the nut 64 to the inner spindle adapter 66. This adapter is hollow and removably receives the inner thrust bearing 68. The forward end of the elongated inner piston rod 70 is attached to this thrust bearing, by means of the nut 72. The piston rod and inner spindle thus are connected together for simultaneous longitudinal movement while permitting axial rotation of the inner spindle relative to the piston rod.

The rearward end of the inner piston rod is connected to the inner piston 74 which is reciprocative in the elongated hollow inner cylinder 76. An annular flange 78 adjacent the rearward end of the cylinder is secured to the rearward end of the outer piston guide tube 46, thereby supporting the inner cylinder concentrically within said guide tube.

Adjacent the forward, closed end of the inner cylinder, through which the inner piston rod extends, a passageway 80 is provided in the cylinder wall. Connected to this passageway is a conduit 82 which extends rearwardly through the space between the inner cylinder and outer piston guide tube. The passageway and conduit communicate the forward end of the inner piston, through a control valve (not shown) selectively with a source of hydraulic fluid pressure and exhaust. Similarly, the rearward end of the inner piston communicates through the passageway 84 in the rear end wall of the inner cylinder, the conduit 86 and a control valve (not shown) selectively with a source of hydraulic fluid pressure and exhaust. Thus, the inner piston may be caused to reciprocate through the inner cylinder either forwardly or rearwardly by appropriate application of hydraulic fluid pressure to the rear or front end of the piston, as will be apparent.

It is to be noted that the inner piston-cylinder unit is disposed concentrically and substantially completely within the outer piston-cylinder unit. The length of the dual chuck and drive assembly thus is minimized. This arrangement not only minimizes plant space requirement but also minimizes the support structure for the assembly.

It is to be noted further that the arrangement of the outer cylinder 42 and thrust tube 44 effectively conceals all moving parts of the assembly against the deleterious effects of dust and debris. This arrangement thus insures against jamming and other damage to the apparatus and minimizes the incidence of maintenance and repair.

Still further, it is to be noted that the concentric arrangement of the minimum number of components greatly facilitates assembly and disassembly for economical manufacture and minimum maintenance costs and production down time.

It will be apparent to those skilled in the art that various changes in the size, shape, number and arrangement of parts described hereinbefore may be made without departing from the spirit of this invention.

Having now described my invention and the manner in which it may be used, I claim:

1. In a veneer lathe having inner and outer chuck members mounted on concentrically arranged inner and outer spindle members supported on a frame and interconnected for simultaneous rotation and for relative longitudinal movement, the combination therewith of drive means for said spindles, comprising:
(a) a hollow elongated outer hydraulic piston-cylinder unit including an outer cylinder mounted on the frame and having inner and outer walls defining an annular piston-receiving chamber therebetween, and an outer annular piston reciprocative in said annular chamber,
(b) outer annular thrust bearing means interconnecting the outer piston and outer spindle for relative axial rotation,
(c) an elongated inner hydraulic piston-cylinder unit including an inner cylinder mounted concentrically within the inner wall of the outer cylinder and an inner piston reciprocative in the inner cylinder,
(d) inner thrust bearing means interconnecting the inner piston and inner spindle for relative axial rotation, and
(e) passageway means communicating the opposite ends of the outer and inner cylinders selectively with a source of hydraulic fluid pressure and with exhaust.

2. The combination of claim 1 including a hollow thrust tube interposed between the frame and the cylinder of the outer piston-cylinder unit and surrounding the outer thrust bearing means.

3. The combination of claim 1 wherein the passageway means communicating the inner end of the inner cylinder extends between the inner cylinder and the inner wall of the outer cylinder.

4. The combination of claim 1 including a hollow outer piston rod attached at one end to the outer annular piston and extending through the annular chamber of the outer cylinder, the outer thrust bearing means interconnecting the inner end of the piston rod and outer spindle for relative axial rotation.

References Cited

UNITED STATES PATENTS

| | | | |
|---|---|---|---|
| 2,869,596 | 1/1959 | Latimer | 144—209 |
| 3,176,735 | 4/1965 | Pelto | 144—209 |
| 3,252,488 | 5/1966 | Molyneux | 144—209 |

DONALD R. SCHRAN, Primary Examiner

U.S. Cl. X.R.

82—40